(12) United States Patent
Winner et al.

(10) Patent No.: US 10,769,657 B2
(45) Date of Patent: Sep. 8, 2020

(54) MEASURING CONVERSION OF AN ONLINE ADVERTISING CAMPAIGN INCLUDING REFERRAL OFFERS FROM AN OFFLINE MERCHANT

(75) Inventors: Jeffrey Winner, Los Altos, CA (US); Geraud Boyer, San Francisco, CA (US); Amit Kumar, Palo Alto, CA (US); Eckart Walther, Palo Alto, CA (US)

(73) Assignee: CARDSPRING, LLC, San Francisco, CA (US)

( * ) Notice: Subject to any disclaimer, the term of this patent is extended or adjusted under 35 U.S.C. 154(b) by 640 days.

(21) Appl. No.: 13/211,270

(22) Filed: Aug. 16, 2011

(65) Prior Publication Data

US 2012/0209696 A1 Aug. 16, 2012

Related U.S. Application Data

(60) Provisional application No. 61/442,943, filed on Feb. 15, 2011, provisional application No. 61/442,691, filed on Feb. 14, 2011.

(51) Int. Cl.
*G06Q 30/02* (2012.01)

(52) U.S. Cl.
CPC ......... *G06Q 30/0246* (2013.01); *G06Q 30/02* (2013.01); *G06Q 30/0273* (2013.01)

(58) Field of Classification Search
USPC ........... 705/14.53, 14.64, 14.58, 14.61, 14.1, 705/14.4, 14.56, 26.1, 14.13, 14.17, 705/14.23, 14.36, 14.38, 14.41, 14.42, 705/14.46, 14.49, 14.5, 14.52, 14.54, 705/14.69, 14.73, 26.2, 26.3, 319, 329, 705/35, 36, 37, 7.29, 80; 707/E17.008, 707/E17.017, 999.005
See application file for complete search history.

(56) References Cited

U.S. PATENT DOCUMENTS

| | | | |
|---|---|---|---|
| 5,175,415 | A | 12/1992 | Mansvelt et al. |
| 5,175,416 | A | 12/1992 | Mansvelt et al. |
| RE36,788 | E | 7/2000 | Mansvelt et al. |
| 6,138,107 | A | 10/2000 | Elgamal |
| 6,169,975 | B1 | 1/2001 | White et al. |

(Continued)

FOREIGN PATENT DOCUMENTS

WO 2008067543 A2 6/2008

OTHER PUBLICATIONS

Steinfield, Charles et al: Click and Mortar Strategies Viewed from the Web: A Content Analysis of Features Illustrating Integration Between Retailers' Online and Offline Presence. Electronic Markets, vol. 15, No. 3, 2005. Available at: https://msu.edu/~steinfie/EM_2005.pdf (Year: 2005).*

(Continued)

*Primary Examiner* — Katherine Kolosowski-Gager
(74) *Attorney, Agent, or Firm* — Smith Baluch LLP

(57) ABSTRACT

A technique for determining the effectiveness of an offer includes analyzing views, clicks, acceptances and satisfactions of the offer. Transaction data is retrieved to determine whether criteria of the offer has been satisfied. As a result, a total cost per transaction may be determined for an advertisement campaign that incorporates the offer. Further, detailed queries may be issued to identify areas in which the offer needs improvement.

27 Claims, 6 Drawing Sheets

(56) References Cited

U.S. PATENT DOCUMENTS

| | | |
|---|---|---|
| 6,298,330 B1 | 10/2001 | Gardenswartz et al. |
| 6,332,126 B1 | 12/2001 | Peirce et al. |
| 6,505,168 B1 | 1/2003 | Rothman et al. |
| 6,606,606 B2 | 8/2003 | Starr |
| 7,035,855 B1 | 4/2006 | Kilger et al. |
| 7,444,658 B1 | 10/2008 | Matz et al. |
| 7,668,785 B1 | 2/2010 | Hammad |
| 7,677,450 B1 | 3/2010 | Rajewski |
| 7,698,269 B2 | 4/2010 | Zhou et al. |
| 7,729,940 B2 | 6/2010 | Harvey et al. |
| 7,734,502 B1 | 6/2010 | Yehoshua et al. |
| 7,797,233 B2 | 9/2010 | Sobek |
| 8,000,933 B1 | 8/2011 | Poeltl et al. |
| 8,112,301 B2 | 2/2012 | Harvey et al. |
| 8,131,594 B1 | 3/2012 | Yehoshua et al. |
| 8,135,647 B2 | 3/2012 | Hammad et al. |
| 8,244,584 B1 | 8/2012 | O'Shea et al. |
| 8,335,739 B1 | 12/2012 | Bol et al. |
| 8,421,663 B1 | 4/2013 | Bennett |
| 8,620,738 B2 | 12/2013 | Fordyce et al. |
| 8,626,579 B2 | 1/2014 | Fordyce et al. |
| 8,630,200 B2 | 1/2014 | St Jean et al. |
| 8,661,161 B2 | 2/2014 | Zhang |
| 9,268,750 B2 | 2/2016 | Lansford et al. |
| 9,411,900 B2 | 8/2016 | Vishria et al. |
| 9,412,102 B2 | 8/2016 | Wolf et al. |
| 9,430,773 B2 | 8/2016 | Aloni et al. |
| 9,477,771 B2 | 10/2016 | Aoki et al. |
| 9,613,361 B2 | 4/2017 | Wolf et al. |
| 9,841,282 B2 | 12/2017 | VonDerheide et al. |
| 2002/0016774 A1 | 2/2002 | Pendlebury |
| 2002/0107986 A1 | 8/2002 | Pfohe et al. |
| 2002/0120530 A1 | 8/2002 | Sutton et al. |
| 2003/0040363 A1 | 2/2003 | Sandberg |
| 2003/0061093 A1 | 3/2003 | Todd |
| 2003/0097297 A1 | 5/2003 | Cavarretta et al. |
| 2003/0155903 A1 | 8/2003 | Gauthier et al. |
| 2003/0158844 A1 | 8/2003 | Kramer et al. |
| 2003/0172145 A1 | 9/2003 | Nguyen |
| 2003/0216990 A1 | 11/2003 | Star |
| 2004/0177037 A1 | 9/2004 | Lee |
| 2004/0230536 A1 | 11/2004 | Fung et al. |
| 2005/0055275 A1 | 3/2005 | Newman et al. |
| 2005/0075932 A1 | 4/2005 | Mankoff |
| 2006/0085357 A1 | 4/2006 | Pizarro |
| 2006/0149671 A1 | 7/2006 | Nix et al. |
| 2006/0212355 A1* | 9/2006 | Teague ................ G06Q 30/02 |
| | | 705/14.16 |
| 2006/0273831 A1 | 12/2006 | Maksimovic et al. |
| 2007/0027757 A1* | 2/2007 | Collins ............... G06F 17/2785 |
| | | 705/14.49 |
| 2007/0073585 A1* | 3/2007 | Apple et al. .................. 705/14 |
| 2007/0124500 A1 | 5/2007 | Bedingfield et al. |
| 2007/0136279 A1 | 6/2007 | Zhou et al. |
| 2008/0010120 A1 | 1/2008 | Chung et al. |
| 2008/0046314 A1 | 2/2008 | Chung et al. |
| 2008/0059306 A1 | 3/2008 | Fordyce et al. |
| 2008/0059329 A1* | 3/2008 | Luchene et al. ............... 705/26 |
| 2008/0065474 A1 | 3/2008 | Sharma et al. |
| 2008/0065490 A1 | 3/2008 | Novick et al. |
| 2008/0147550 A1 | 6/2008 | Morsillo et al. |
| 2008/0147552 A1 | 6/2008 | Morsillo et al. |
| 2008/0167017 A1 | 7/2008 | Wentker et al. |
| 2008/0195579 A1 | 8/2008 | Kennis et al. |
| 2008/0217397 A1 | 9/2008 | Degliantoni et al. |
| 2008/0235351 A1 | 9/2008 | Banga et al. |
| 2008/0300984 A1 | 12/2008 | Li |
| 2009/0043696 A1 | 2/2009 | Ornce et al. |
| 2009/0070583 A1 | 3/2009 | Mueller et al. |
| 2009/0072026 A1 | 3/2009 | Lee et al. |
| 2009/0100099 A1 | 4/2009 | Buckwalter |
| 2009/0132366 A1 | 5/2009 | Lam et al. |
| 2009/0164315 A1 | 6/2009 | Rothman |
| 2009/0191962 A1 | 7/2009 | Hardy et al. |
| 2009/0216579 A1 | 8/2009 | Zen et al. |
| 2009/0228365 A1 | 9/2009 | Thomchek et al. |
| 2009/0271317 A1 | 10/2009 | Walker et al. |
| 2010/0063903 A1 | 3/2010 | Whipple et al. |
| 2010/0075638 A1 | 3/2010 | Carlson et al. |
| 2010/0114686 A1 | 5/2010 | Carlson et al. |
| 2010/0262484 A1 | 10/2010 | Bardin et al. |
| 2010/0268611 A1 | 10/2010 | Reid et al. |
| 2010/0274650 A1* | 10/2010 | Kantor .................. G06Q 30/02 |
| | | 705/14.16 |
| 2010/0299194 A1 | 11/2010 | Snyder et al. |
| 2010/0306040 A1* | 12/2010 | Arumugam ............ G06Q 30/02 |
| | | 705/14.16 |
| 2010/0332304 A1* | 12/2010 | Higgins et al. ............ 705/14.16 |
| 2011/0029367 A1 | 2/2011 | Olson et al. |
| 2011/0029396 A1 | 2/2011 | Sobek |
| 2011/0057027 A1 | 3/2011 | Grossman et al. |
| 2011/0066497 A1 | 3/2011 | Gopinath et al. |
| 2011/0087531 A1 | 4/2011 | Winters et al. |
| 2011/0099108 A1 | 4/2011 | Fung et al. |
| 2011/0106840 A1 | 5/2011 | Barrett et al. |
| 2011/0125565 A1 | 5/2011 | MacIlwaine et al. |
| 2011/0125593 A1 | 5/2011 | Wright et al. |
| 2011/0137740 A1 | 6/2011 | Bhattacharya et al. |
| 2011/0161149 A1 | 6/2011 | Kaplan |
| 2011/0225033 A1* | 9/2011 | Schmeyer ............. G06Q 10/02 |
| | | 705/14.32 |
| 2011/0231224 A1* | 9/2011 | Winters ............. G06Q 30/0201 |
| | | 705/7.29 |
| 2011/0231258 A1 | 9/2011 | Winters |
| 2011/0246369 A1 | 10/2011 | de Oliveira et al. |
| 2011/0264499 A1 | 10/2011 | Abendroth et al. |
| 2011/0289434 A1 | 11/2011 | Kieft |
| 2011/0295990 A1 | 12/2011 | St Jean et al. |
| 2011/0302022 A1* | 12/2011 | Fordyce et al. ............ 705/14.35 |
| 2012/0035997 A1 | 2/2012 | Burgess et al. |
| 2012/0047008 A1 | 2/2012 | Alhadeff et al. |
| 2012/0060108 A1 | 3/2012 | Domartini |
| 2012/0075137 A1 | 3/2012 | Tanizawa |
| 2012/0084135 A1* | 4/2012 | Nissan .................. G06Q 30/06 |
| | | 705/14.38 |
| 2012/0095819 A1 | 4/2012 | Li |
| 2012/0143705 A1 | 6/2012 | Bhattacharya et al. |
| 2012/0150669 A1 | 6/2012 | Langley et al. |
| 2012/0166272 A1 | 6/2012 | Wiley et al. |
| 2012/0203604 A1* | 8/2012 | Baker ................ G06Q 30/0207 |
| | | 705/14.17 |
| 2012/0203929 A1 | 8/2012 | Patalsky |
| 2012/0209672 A1 | 8/2012 | Winner et al. |
| 2012/0209695 A1 | 8/2012 | Winner et al. |
| 2012/0209696 A1 | 8/2012 | Winner et al. |
| 2012/0209771 A1 | 8/2012 | Winner et al. |
| 2012/0215610 A1* | 8/2012 | Amaro .................. G06Q 30/02 |
| | | 705/14.23 |
| 2012/0271770 A1 | 10/2012 | Harris et al. |
| 2012/0284105 A1 | 11/2012 | Li |
| 2012/0316941 A1 | 12/2012 | Moshfeghi |
| 2013/0143533 A1 | 6/2013 | Carlson et al. |
| 2013/0159233 A1 | 6/2013 | Mason et al. |
| 2013/0218652 A1 | 8/2013 | Fargo et al. |
| 2013/0227662 A1 | 8/2013 | Crampton |
| 2013/0282592 A1 | 10/2013 | Zambrana et al. |
| 2013/0290821 A1 | 10/2013 | Pollack |
| 2014/0129733 A1 | 5/2014 | Klais et al. |
| 2014/0156407 A1 | 6/2014 | Dinardo, Sr. et al. |
| 2014/0372325 A1 | 12/2014 | Zambrana et al. |
| 2015/0025981 A1 | 1/2015 | Zaretsky et al. |
| 2015/0186930 A1 | 7/2015 | Winner et al. |
| 2015/0332365 A1 | 11/2015 | Kassemi et al. |
| 2015/0370899 A1 | 12/2015 | Jung |
| 2016/0267060 A1 | 9/2016 | Skirpa et al. |
| 2016/0277315 A1 | 9/2016 | Miller et al. |
| 2016/0308936 A1 | 10/2016 | Yuan |
| 2017/0034013 A1 | 2/2017 | Cherian et al. |
| 2017/0178223 A1 | 6/2017 | Ranasinghe et al. |
| 2017/0289350 A1 | 10/2017 | Philbin et al. |

(56) References Cited

OTHER PUBLICATIONS

CardSpring, "CardSpring Launches New Payment Network Platform That Lets Developers Create Applications for Payment Cards," SYS-CON, 2008, 3 pp.

U.S. Appl. No. 14/656,555, filed Mar. 12, 2015 by Jeffrey Winner.

Prosecution History from U.S. Appl. No. 13/211,253 from Feb. 13, 2012 through Mar. 3, 2015 32 pp.

Final Office Action from U.S. Appl. No. 13/211,253, dated Oct. 8, 2015, 16 pp.

Amendment in Response to Office Action dated Oct. 8, 2015, from U.S. Appl. No. 13/211,253, filed Jan. 8, 2016, 11 pp.

Extended Search Report from counterpart European Application No. 15163296.5, dated Sep. 30, 2015, 13 pp.

Office Action from U.S. Appl. No. 14/656,555, dated Sep. 1, 2017, 14 pp.

Office Action from U.S. Appl. No. 13/211,253, dated Sep. 5, 2017, 14 pp.

Response to Final Office Action from U.S. Appl. No. 13/211,253, filed Mar. 8, 2016 11 pgs.

Final Office Action from U.S. Appl. No. 14/656,555, dated Jun. 28, 2018, 26 pp.

Amendment in Response to Office Action dated Dec. 21, 2017, from U.S. Appl. No. 13/211,253, filed Jun. 21, 2018, 19 pp.

Amendment in Response to Office Action dated Sep. 1, 2017, from U.S. Appl. No. 14/656,555, filed Dec. 19, 2017, 18 pp.

Appeal Brief in U.S. Appl. No. 12/849,789, filed Apr. 3, 2017,35 pages.

CardSpring, "CardSring Launches New Payment Network Platform That Lets Developers Create Applications for Payment Cards," 2008, pp. 1-3.

Final Office Action from U.S. Appl. No. 13/211,262, dated Jan. 31, 2013.

Non-Final Office Action from U.S. Appl. No. 13/211,253, dated Oct. 3, 2014.

Non-Final Office Action from U.S. Appl. No. 13/211,262, dated Aug. 13, 2014.

Non-Final Office Action from U.S. Appl. No. 13/211,262, dated Jul. 11, 2012.

Non-Final Office Action from U.S. Appl. No. 13/211,262, dated Mar. 20, 2014.

Non-Final Office Action from U.S. Appl. No. 13/211,262, dated Nov. 19, 2013.

Non-Final Office Action from U.S. Appl. No. 13/211,265, dated Sep. 12, 2014. 14 pp.

Non-Final Office Action in U.S. Appl. No. 14/656,555 dated Mar. 7, 2019, 24 pages.

Office Action from U.S. Appl. No. 13/211,253, dated Dec. 21, 2017, 15 pp.

\* cited by examiner

MEASURING CONVERSION OF AN ONLINE ADVERTISING CAMPAIGN INCLUDING REFERRAL OFFERS FROM AN OFFLINE MERCHANT

CROSS-REFERENCE TO RELATED APPLICATIONS

This application claims priority benefit to U.S. provisional patent application titled, "SYSTEM AND METHOD IMPLEMENTING REFERRAL PROGRAMS," filed on Feb. 15, 2011, having application Ser. No. 61/442,943 (Attorney Docket Number CARD/0002USL) and also claims priority benefit to United States provisional patent application titled, "SYSTEM AND METHOD FOR IMPLEMENTING PAYMENT NETWORK COOKIES," filed on Feb. 14, 2011, having application Ser. No. 61/442,691 (Attorney Docket Number CARD/0003USL), both of which are incorporated by reference herein.

BACKGROUND

1. Field of the Invention

The present invention relates to the field of computer software and, in particular, to a system and method for quantizing the effectiveness of an advertising campaign.

2. Description of the Related Art

Online advertising is a form of promotion that uses the internet to deliver marketing messages to potential customers. Examples of online advertising include contextual advertisements on search engine results pages, banner advertisements, rich media (e.g., video) advertisements, social network advertisements, interstitial advertisements, online classified advertisements, e-mail marketing, and many others.

One important aspect of an online advertisement is the online "conversion" of the online advertisement, which refers generally to a customer completing an online transaction with an online merchant in response to viewing the online advertisement. Typically, when a customer views an online advertisement, the customer's activity across one or more web pages is tracked to determine whether a particular online transaction is actually completed by the customer. One example of a tracking technique is referred to as pixel-based tracking, where a 1×1 pixel image—often referred to as a "web beacon"—is linked to an online advertisement and included in each web page of, for example, an online shopping cart. The 1×1 pixel image reports information back to a manager of the online advertisement such that the manager is able to determine whether the customer has reached an order confirmation page, indicating that the online advertisement was successful by resulting in a conversion.

Although most merchants provide their customers the ability to shop online, there exists a large number of merchants that have one or more brick-and-mortar locations, referred to herein as "offline" merchants. Though offline merchants typically do not provide an online shopping cart to their customers, the offline merchants may nonetheless be interested in online advertising that causes customers to visit their brick-and-mortar locations in an attempt to increase sales. Unfortunately, as with offline advertising (e.g., advertising in magazines, TV, radio, etc.), it is difficult for offline merchants to measure the performance of their online advertising campaigns.

One attempt to measure performance of an advertising campaign involves polling customers and asking them to share the motivation for the purchase they are making. For example, if a customer shops at a merchant location during a sale, then the merchant may ask the customer, "Where did you hear about our sale?" Unfortunately, some customers are lazy and do not wish to share such information with the merchant or may provide inaccurate information. Determining the effectiveness of an online portion of ad campaign is further complicated when the same advertisements are presented to potential customers through other channels that are not online.

As the foregoing illustrates, there is a need in the art for an improved technique for quantizing the effectiveness of an advertising campaign.

SUMMARY

One embodiment of the invention provides a method for determining the effectiveness of an offer. The method includes identifying an offer viewed by a customer, determining that the customer performs a first action in response to viewing the offer, determining that the customer has not performed a second action after performing the first action, and generating a report that displays details associated with the first action and the second action.

Another embodiment of the invention provides a method for providing query access to transaction data. The method includes receiving a query that includes one or more parameters, receiving one or more transactions that correspond to the query, filtering the one or more transactions to exclude transactions that do not correspond to an offer, determining for each of the filtered one or more transactions whether the transaction satisfies the corresponding offer, analyzing the filtered one or more transactions based on the query, and generating an output that displays results associated with the filtered one or more transactions.

Further embodiments of the present invention provide a computer-readable storage medium that includes instructions for causing a computer system to carry out one or more of the methods set forth above.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, several specific details are presented to provide a thorough understanding of embodiments of the invention. One skilled in the relevant art will recognize, however, that the concepts and techniques disclosed herein can be practiced without one or more of the specific details, or in combination with other components, etc. In other instances, well-known implementations or operations are not shown or described in detail to avoid obscuring aspects of various examples disclosed herein.

Figure 1:
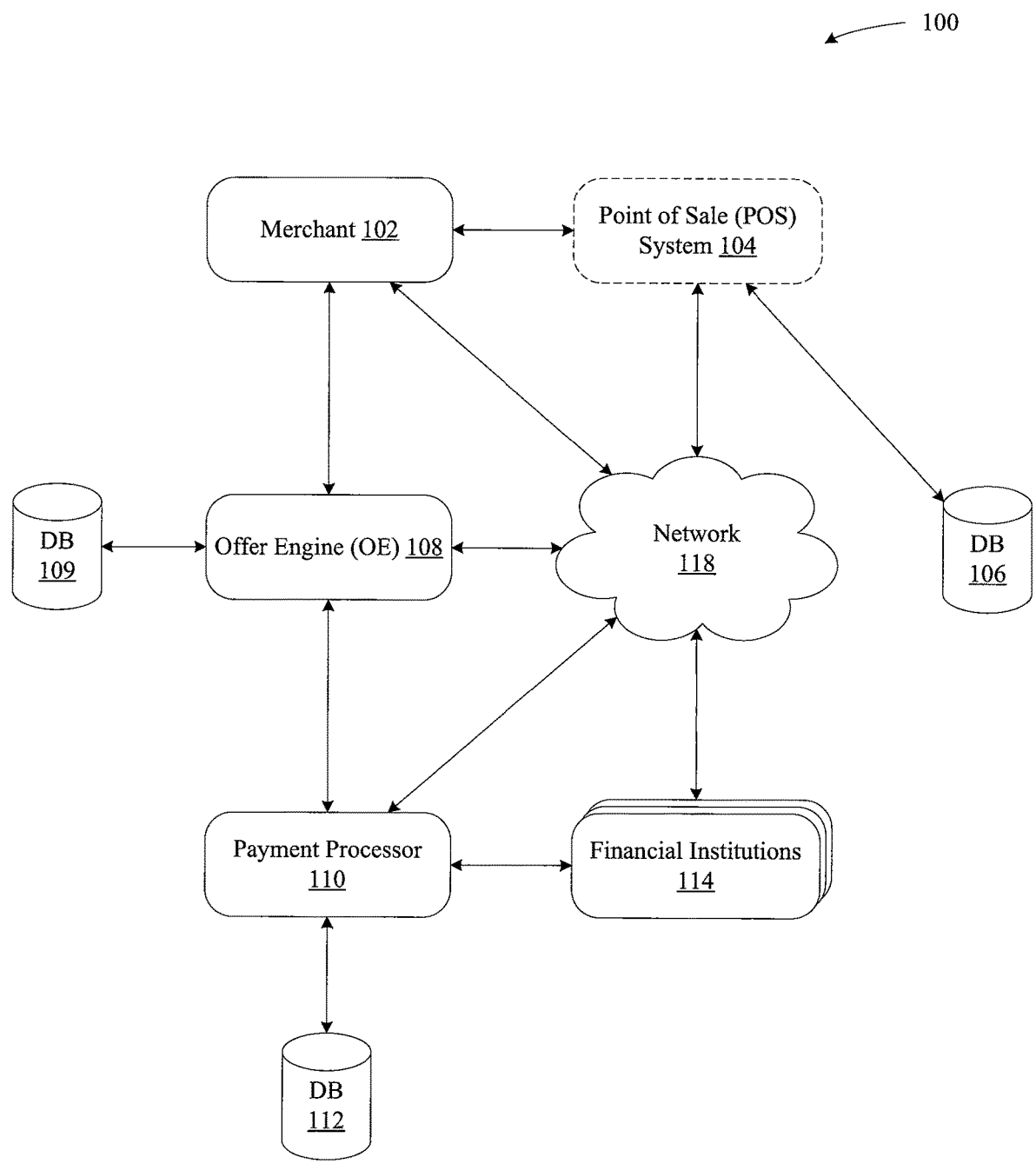
FIG. 1 is a block diagram illustrating components of a system in which embodiments of the present invention may be implemented.

FIG. 1 is a block diagram illustrating components of a system 100 in which embodiments of the invention may be implemented. As shown, system 100 includes a merchant 102, a point of sale (POS) system 104 with an associated database 106, an offer engine (OE) 108 with an associated database 109, a payment processor 110 with an associated database 112, one or more financial institutions 114, and a network 118. As shown, merchant 102, OE 108, payment processor 110 and financial institutions 114 communicate with one another via network 108, such as the internet.

Though not illustrated in FIG. 1, each of OE 108, payment processor 110 and POS system 104 include conventional components of a computing device, e.g., a processor, system memory, a hard disk drive, input devices such as a mouse and a keyboard, and output devices such as a monitor.

In one embodiment, DB 106, DB 109 and/or DB 112 can be any type of storage system, e.g., a relational database hosted on a network file system (NFS) device, a storage system hosted by a cloud service provider, and the like. Alternatively, DB 106, DB 109 and/or DB 112 may be integrated in POS system 104, OE 108 and payment processor 110, respectively, such as a database hosted on a local disk and managed by an operating system.

Merchant 102 may be a brick-and-mortal physical merchant, an online merchant, a mail-order/telephone-order (MOTO) merchant, and the like. Merchant 102 is capable of processing accounts of customers when they pay for goods or services offered by merchant 102. Such accounts include credit cards, debit cards, prepaid cards, and the like. In some embodiments, merchant 102 is equipped with POS system 104. As shown, POS system 104 is coupled to database 106, which enables POS system 104 to store detailed information associated with transactions between merchant 102 and customers of merchant 102.

A transaction may be initiated at merchant 102 according to a variety of techniques. For example, a cashier at merchant 102 may swipe a credit card through a card reader included in POS system 104. Alternatively, an account may be delivered virtually on a customer's mobile device, which enables a customer at merchant 102 to wave his/her mobile device in front of a contactless card reader included in POS system 104. Further, the customer may show his/her mobile device to a cashier at merchant 102 who manually enters an account number of the account being used by the customer. Alternatively, the mobile device may include a contactless chip or tag that is wireless-readable by POS system 104 using, e.g., near-field-communication (NFC) technology.

Payment processor 110, in conjunction with financial institutions 114, facilitates payment transactions between merchant 102 and customers thereof, and stores the transactions in DB 112. More specifically, when a customer attempts to pay for goods and/or services offered by merchant 102 using his or her account, a POS terminal submits the transaction through a merchant account to an acquiring bank of the merchant (i.e., one of the financial institutions 114). The acquiring bank then transmits a request for funds through the payment processor 110. The payment processor 110 routes the request for funds to the card holder's issuing bank (i.e., the appropriate financial institution 114) for authorization based on a type of the account. The issuing bank verifies the card number, the transaction type, and the amount. In some examples, the issuing bank then reserves that amount of the cardholder's credit limit for the merchant.

For example, if payment processor 110 detects that the account is a debit card associated with a checking account of the customer, then payment processor 110 routes the transaction request to the bank that issued the debit card, whereupon the issuing bank indicates to payment processor 110 whether the checking account possesses sufficient funds to satisfy the transaction request. In turn, payment processor 110 indicates to the merchant acquiring bank whether the request is for funds has been approved. If the transaction is successfully processed, then funds are transferred from the card holder's account at the issuing bank to the merchant account at the inquiring bank.

An offer engine (POE) 108 is configured to determine the effectiveness of advertising campaigns requested and managed by merchant 102. As shown in FIG. 1, OE 108 is in communication with both merchant 102 and payment processor 110. OE 108 manages "offers" that are advertised to, possibly accepted by, and possibly satisfied by customers of merchant 102. The offer can be coupled to a reward that is given to the customer when he or she has satisfied the offer, e.g., cash-back rewards, credit card rewards, store credit, virtual currency, and the like.

An offer may be any offer that involves a customer completing a transaction according to specific criteria, such as buying a certain amount of a product, spending a certain amount in one purchase, making a purchase at a particular time, making a number of purchases within a particular amount of time, and the like. Offers may also involve a group of customers completing a transaction according to specific criteria. As is described in greater detail herein, OE 108 is configured to monitor for transactions to determine whether the criteria for a particular offer have been satisfied. As is also described herein, OE 108 can monitor both online and offline transactions to determine whether the criteria for a particular offer have been satisfied.

Offer data is stored in database 109 accessed by OE 108. The offer data is advertised to customers via webpage advertisements, email marketing campaigns, short-message-service (SMS) messages, telemarketing campaigns, and the like, as described herein. As described below in conjunction with FIG. 2, OE 108 provides an interface that enables customers (e.g., individuals) to register an account with OE 108, including their account information, and subsequently accept and complete offers. OE 108 subsequently monitors transactions initiated at merchant 102 (i.e., online and/or offline) to determine whether offers are satisfied by the customers whom accepted them.

Figure 2:
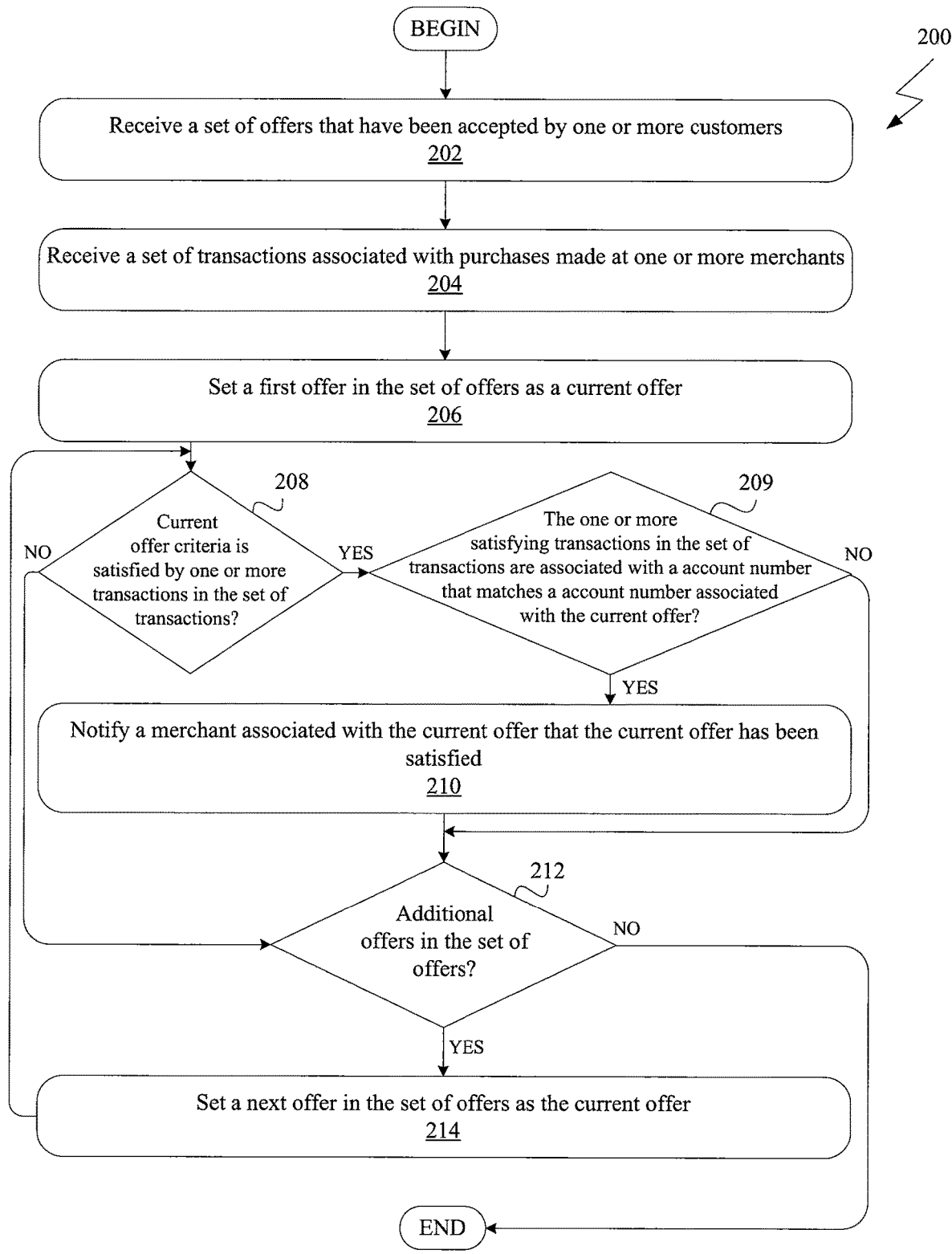
FIG. 2 is a flow diagram of method steps for determining whether a set of offers have been satisfied, according to one embodiment of the invention.

FIG. 2 is a flow diagram of method steps 200 for determining whether a set of offers has been satisfied, according to one embodiment of the invention. Persons skilled in the art will understand that, even though method 200 is described in conjunction with FIG. 1, any system configured to perform the method steps, in any order, is within the scope of embodiments of the invention. As shown, method 200 begins at step 202, where OE 108 receives a set of offers that have been accepted by one or more customers. For example, OE 108 may query database 109 to return a set of offers that have not been marked as expired or satisfied such that only outstanding and/or valid offers are processed.

At step 204, OE 108 receives a set of transactions associated with purchases made at one or more merchants. In one embodiment, OE 108 receives the set of transactions by querying payment processor 110 for particular transactions from one or more merchants. In one example, OE 108 may transmit to payment processor 110 both an ID of a merchant and a set of hashed account numbers associated with customers who have accepted at least one offer with the merchant. In response, payment processor 110 returns transactions that match the hashed account numbers. In another embodiment, a merchant can give the payment processor 110 permission to deliver all transactions from the merchant to a third party, such as OE 108. For example, the transactions can be delivered to the OE 108 periodically (e.g., daily) or in real-time.

At step 206, OE 108 sets a first offer in the set of offers as a current offer. At step 208, OE 108 determines whether criteria of the current offer are satisfied by one or more transactions in the set of transactions. In one embodiment, each offer is associated with executable code that, when executed by OE 108, enables OE 108 to determine whether the current offer has been satisfied by one or more transactions in the set of transactions. For example, if a customer accepts an offer that requires him or her to make an in-store purchase at merchant 102 between the hours of 2:00 PM-6:00 PM, and OE 108 determines from a transaction in the set of transactions that a customer performs a purchase at merchant 102, then OE 108 analyzes timestamp data included the transaction to determine whether the transaction was performed between the required hours.

If, at step 208, OE 108 determines that criteria of the current offer are not satisfied by one or more transactions in the set of transactions, then method 200 proceeds to step 212. Otherwise, at step 209, OE 108 determines whether the one or more transactions identified at step 208 are associated with an account number that matches an account number associated with the current offer. In one embodiment, OE 108 extracts a hashed account number from each transaction and compares the hashed account number against the hashed account number associated with the current offer. If, at step 209, OE 108 determines that the one or more transactions identified at step 208 are not associated with an account number that matches an account number associated with the current offer, then method 200 proceeds to step 212. Otherwise, method 200 proceeds to step 210.

At step 210, OE 108 notifies a merchant associated with the current offer that the current offer has been satisfied. In one embodiment, OE 108 is configured to lookup via database 109 notification preferences of the merchant that is associated with the current offer. For example, OE 108 may determine that the merchant associated with the current offer prefers to receive a daily batch file emailed at the end of each day, where the batch file includes line-by-line detail of each customer who satisfied an offer and the reward that is to be given to them. In addition to notifying the merchant, OE 108 may also be configured to notify the customer associated with the current offer that he or she has satisfied the current offer, as described above in conjunction with FIG. 2.

At step 212, OE 108 determines whether additional offers are in the set of offers. If, at step 212, OE 108 determines that additional offers are in the set of offers, then at step 214, OE 108 sets a next offer in the set of offers as the current offer.

In this way, each of the offers in the set of offers are compared against the set of transaction data.

Figure 3:
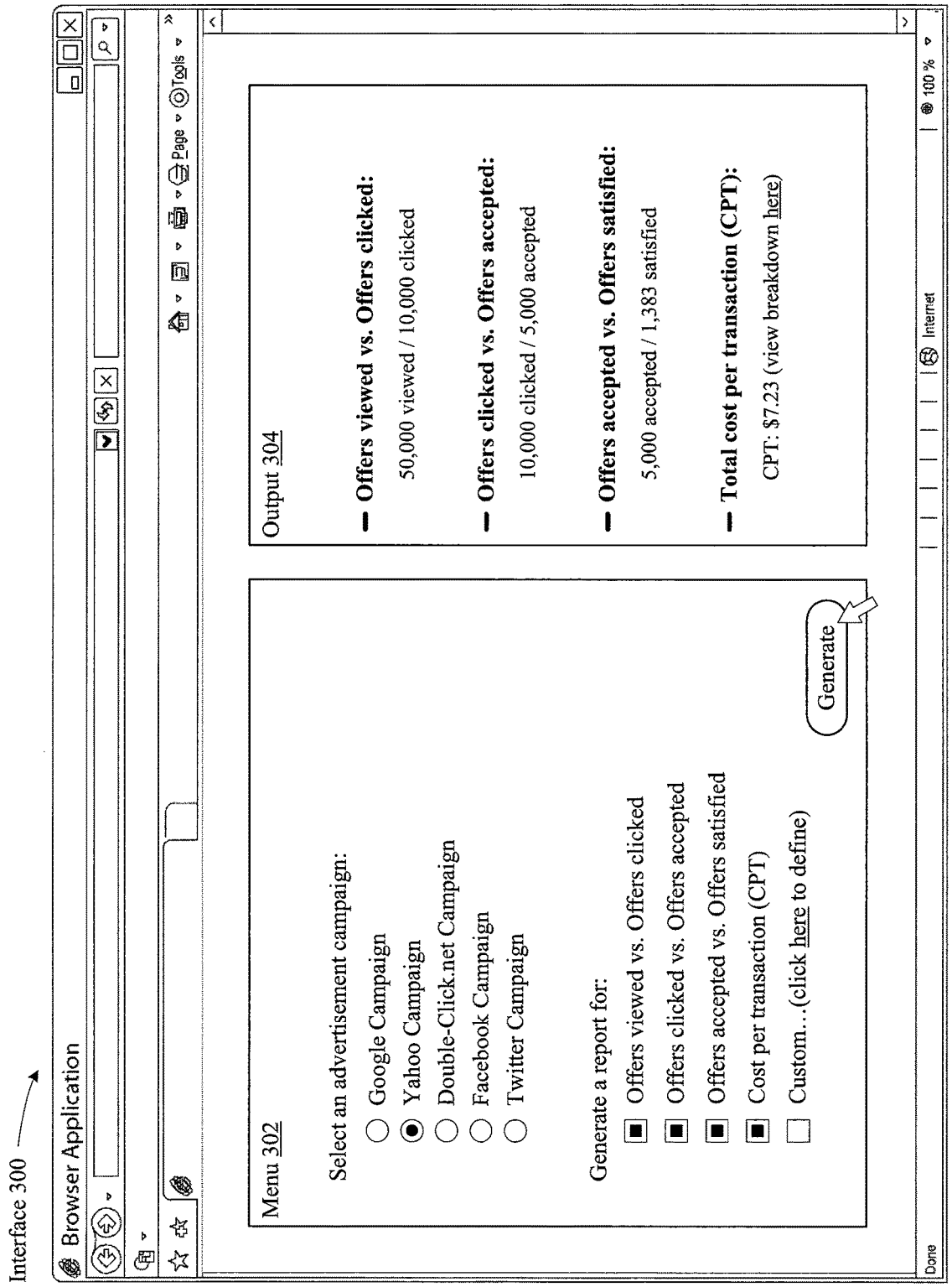
FIG. 3 is a screenshot of an interface that enables a campaign manager to quantize the effectiveness of an ad campaign, according to one embodiment of the invention

FIG. 3 is a screenshot of an interface 300 that enables a campaign manager to quantize the effectiveness of an ad campaign, according to one embodiment of the invention. As shown, interface 300 is accessible via a web browser application and includes a menu 302 and an output 304. Menu 302 enables a campaign manager to choose from ad campaigns that are associated with a merchant that he or she is managing and to generate one or more reports for the chosen ad campaign.

In one embodiment, menu 302 displays to the campaign manager each ad campaign that he or she manages, e.g., ad campaigns that are associated with merchant 102 for which the campaign manager works. Each ad campaign is associated with a description, e.g., "Google Campaign," and is selectable to generate one or more pre-configured or customized reports thereon. For example, the pre-configured report "POs viewed vs. POs clicked" enables the campaign manager to view for a particular ad campaign a report that displays the number of offers viewed by customers vs. the number of offers clicked by customers. Such a report may indicate, for example, that a web page advertisement for an offer that includes a colorful animation causes more customers to click on the offer than a text-only web page advertisement for the offer.

Another example of a pre-configured report, "POs clicked vs. POs accepted" enables the campaign manager to determine which of the offers directly viewed by customers are also accepted by customers. In one example, a customer may be inclined to click on a web advertisement for an offer as a result of the attractiveness of the web advertisement. However, when the offer associated with the web advertisement is displayed to the customer, the customer may find that the offer is not something in which he or she is interested, e.g., when there is a miscorrelation between the offer and the web advertisement associated therewith. As a result, an offer may be clicked by a customer, but is not ultimately accepted by the customer. Alternatively, an offer may be directly correlated to a web advertisement in which the offer is displayed such that there is a high ratio of offers clicked to offers accepted.

Yet another example of a pre-configured report, "POs accepted vs. POs satisfied," enables the campaign manager to determine which of the offers accepted by customers are also satisfied by customers, as described above in conjunction with FIG. 2. In this way, the campaign manager is able to determine, for example, that certain offers, while attractive to a customer in some respects, fail to ultimately encourage the customer to satisfy the offer. In one example, a customer accepts an offer that requires him or her to spend $100.00 or more at a location of merchant 102 during a holiday sale, where the customer is entitled to a $50.00 cash back reward if he or she satisfies the offer. However, for whatever reason, the customer may not shop at a location of merchant 102, so the customer fails to satisfy the offer, despite the attractive $50.00 cash back reward associated therewith.

Yet another example of a pre-configured report, "Cost per transaction (CPT)," enables the campaign manager to determine a CPT for the ad campaign. Specifically, a CPT is representative of an amount of money that an ad campaign costs relative to the number of transactions that result from the ad campaign. For example, referring to output 304 in FIG. 3, the "Yahoo Campaign" caused 50,000 offers to be viewed by customers who, for example, utilize Yahoo's search engine and view offers alongside search results. Of those 50,000 viewed offers, 10,000 are clicked by the customers. Continuing with the example illustrated in output 304, of the 10,000 offers that are clicked by customers, 5,000 are accepted by the customers. Further, of the 5,000 offers that are accepted by the customers, 1,383 have been satisfied, such that 3,617 offers remain outstanding and may or may not ultimately be satisfied. Thus, OE 108 determines at the time that the CPT report is requested, that the CPT for the Yahoo Campaign is: ($10,000/1,383)=$7.23. Advantageously, the campaign manager may compare the CPT of $7.23 against the profit margins of the items that were purchased by the customers. In this way, the campaign manager may determine an exact amount of profit that is yielded for goods and/or services that are purchased in response to offers accepted by customer.

OE 108 may be configured to consider additional data to the data described above when calculating CPTs. In one example, OE 108 determines that a customer accepts a referral offer, where the referral offer requires the customer to get one or more additional customers to both accept and satisfy an offer associated with the referral offer.

In one example of a referral offer, a first customer is exposed to an offer advertisement widget for a referral offer that requires him or her to get five or more additional customers to both accept and satisfy an offer, where the offer requires them to make a purchase of $25.00 or more at merchant 102. Typically, the offer provides incentive to the five or more friends to both accept and satisfy the referral offer, such as $5.00 cash back for making the $25.00 purchase. In turn, the first customer is rewarded $50.00 by merchant 102 when each of the five or more friends both accept and satisfy the offer. The first customer may notify the five friends according to a variety of techniques, such as submitting their email addresses into an interface provided by OE 108, which then delivers a notification of the offer to each email address.

Thus, in the above example, merchant 102 receives business from the five or more friends while only paying the advertising costs involved in getting the first customer to view, click and accept the referral offer. Accordingly, OE 108 updates the CPT by increasing the total number of transactions before dividing the total number of transactions into the cost of the ad campaign, which decreases the CPT value.

Additional data may also be processed by OE 108 when determining a CPT. For example, OE 108 may detect that a customer, subsequent to accepting and satisfying an offer made by merchant 102, continues to shop regularly at merchant 102 without accepting any offers, i.e., he or she becomes a loyal customer of merchant 102. In this way, the CPT is reduced as a result of the number of transactions increasing since there is no increase in advertisement sales that corresponds to the increase in the customer's shopping.

Figure 4:
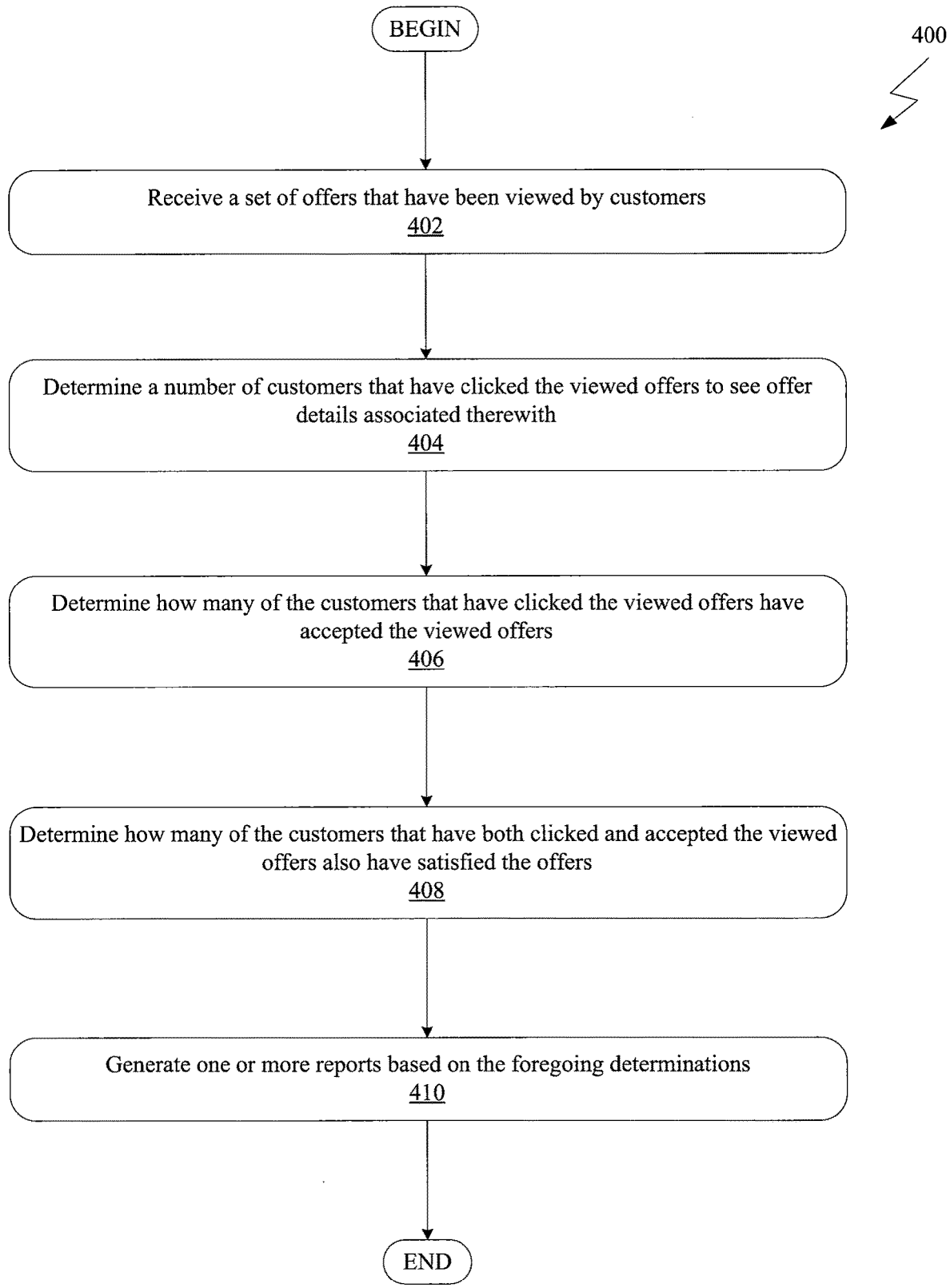
FIG. 4 is a flow diagram of method steps for analyzing the effectiveness of an offer campaign, according to one embodiment of the invention

FIG. 4 is a flow diagram of method steps 400 for analyzing the effectiveness of an offer campaign, according to one embodiment of the invention. Persons skilled in the art will understand that, even though method 400 is described in conjunction with FIGS. 1 and 3, any system configured to perform the method steps, in any order, is within the scope of embodiments of the invention. As shown, method 400 begins at step 402, where OE 108 receives a set of offers that have been viewed by customers. OE 108 may determine that offers have been viewed by customers according to a variety of techniques, including use of browser cookies, Internet Protocol (IP) address tracking, campaign performance information obtained from an ad campaign publisher through which the offers are presented to the customers, and the like.

At step 404, OE 108 determines, for one or more offers, a number of customers that have clicked the viewed offer to view offer details associated therewith. As described herein, a customer that views an offer, e.g., an offer displayed within a web advertisement, may or may not click on the offer to view the details and/or accept the offer. OE 108 determines whether the offer was clicked according to the same techniques described above in step 402. For example, a web advertisement that includes an offer that, when clicked by a customer, is configured to update the state of a browser cookie to reflect that the offer has been clicked. The publisher of the web advertisement, e.g., OE 108, then reads the browser cookie and updates a database, e.g., DB 109, to reflect that the offer was, in fact, clicked by a customer.

At step 406, OE 108 determines how many of the customers that have clicked the viewed offers have accepted the published offers, according to the techniques described above in conjunction with FIG. 2-3.

At step 408, OE 108 determines how many of the customers that have both clicked and accepted the viewed offers also have satisfied the offers, according to the techniques described above in conjunction with FIG. 2-3.

At step 410, OE 108 calculates a total effectiveness of the offers based on the foregoing determinations. Such calculations, for example, may involve generating a CPT or a custom report for one or more ad campaigns, as described above in conjunction with FIG. 3.

Figure 5:
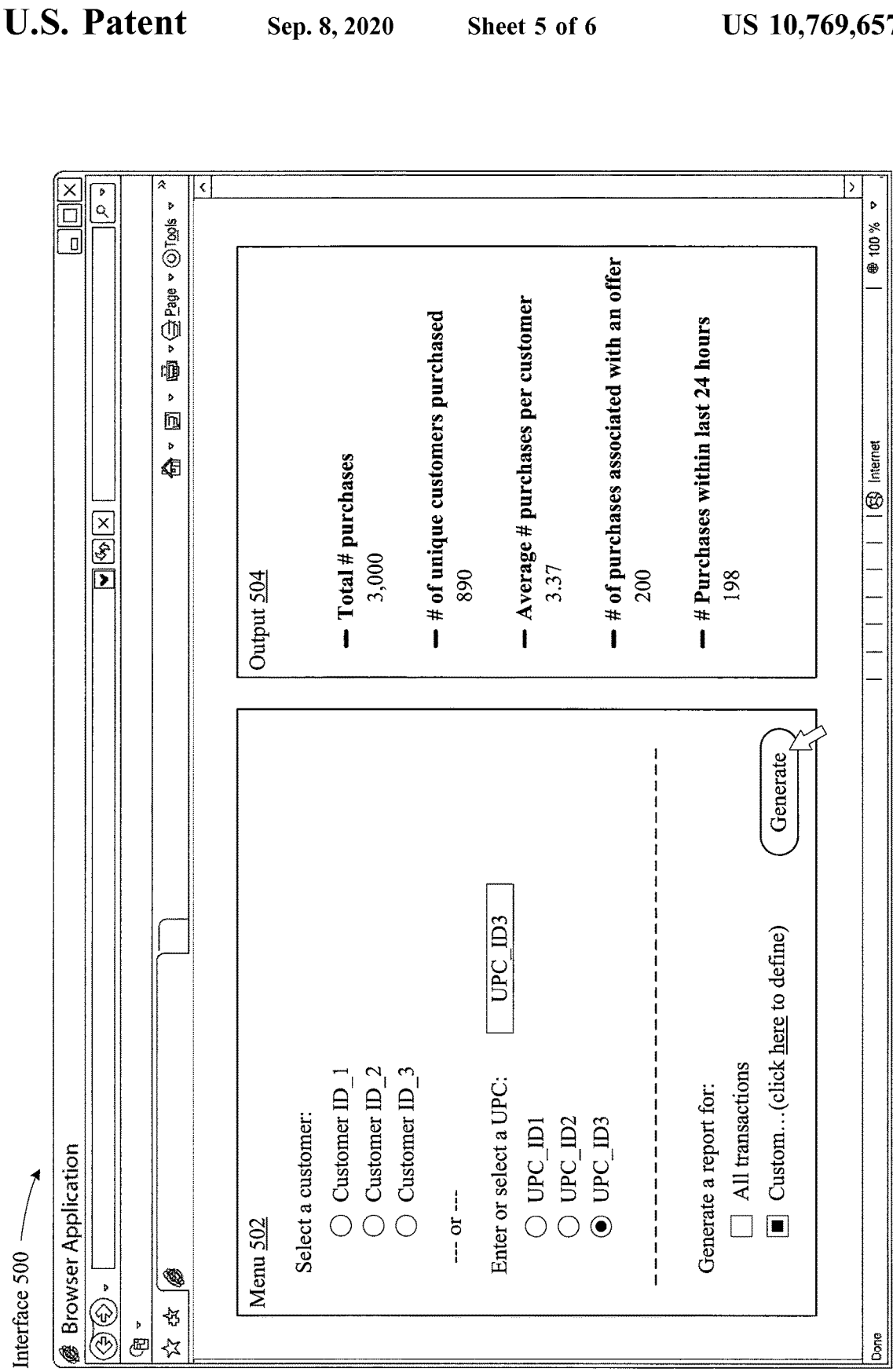
FIG. 5 is a screenshot of an interface that enables a campaign manager to query transaction data, according to one embodiment of the invention.

FIG. 5 is a screenshot of an interface 500 that enables a campaign manager to query transaction data, according to one embodiment of the invention. As shown, interface 500 is accessible via a web browser application and includes a menu 502 and an output 504. Menu 502 enables a campaign manager to, for example, view detailed transaction information for particular customers of merchant 102 along with goods and/or services provided by merchant 102.

In one embodiment, menu 502 displays a list of known customers of merchant 102. In the example illustrated in menu 502, each listed customer corresponds to a unique hashed account number, as described above in conjunction with FIG. 2. For example, OE 108 may parse transaction data obtained from payment processor 110 and group equal hash values as customers that are listed in menu 502. The customers listed in menu 502 may further be highlighted as customers who have accepted one or more offers, i.e., customers known to OE 108. Also shown in menu 502 is a listing of universal product codes (UPC) codes. The listing of UPC codes may be displayed according to a variety of techniques, including listing the most popular items sold by merchant 102, where such information may be obtained, for example, from POS system 104.

Menu 502 enables a campaign manager to select from a list of pre-defined reports, such as "All transactions", which, when generated, displays in output 504 a list of all transactions associated with the selection made in menu 502, e.g., a product associated with a UPC code "ID3". The list of transactions may include, for each transaction in the list, a set of attributes, e.g., a date of the transaction, an amount of the transaction, and the like. Method 502 also enables a campaign manager to generate a customer report where he or she may submit criteria for the transactions that he or she wants to analyze.

For example, in FIG. 5 output 504 displays the results of a custom report for the product associated with the UPC code "ID3". As shown, the custom report displays the total number of purchases (3,000) since the product was introduced. The customer report also displays the number of unique customers who have purchased the product (890), which OE 108 calculates by identifying transactions for the product and identifying the number of unique customers who performed the transactions.

The number of unique customers may then be used to generate an average number of purchases of the product per customer, which is also included in output 504 and has a value of 3.37, which indicates that the typical customer is a repeat-purchaser of the product. The requested report may also cause OE 108 to determine the number of satisfied offers that are associated with the total number of purchases such that the campaign manager may determine whether the offers are effective. Additional customizations to the report may be selected by the campaign manager, including viewing the total number of purchases of the product that have been made within the last twenty-four hours (198).

Though not explicitly illustrated or described in conjunction with FIG. 5, embodiments of the invention provide report generation techniques that enable the campaign manager to query and analyze transaction data using, e.g., any database queries and/or database operations, and any subsequent processing and/or analysis thereon. OE 108 may also be configured to provide detailed information for each customer, e.g., determining whether a particular user has performed a transaction of $25.00 or more at merchant 102 within the past month.

Figure 6:
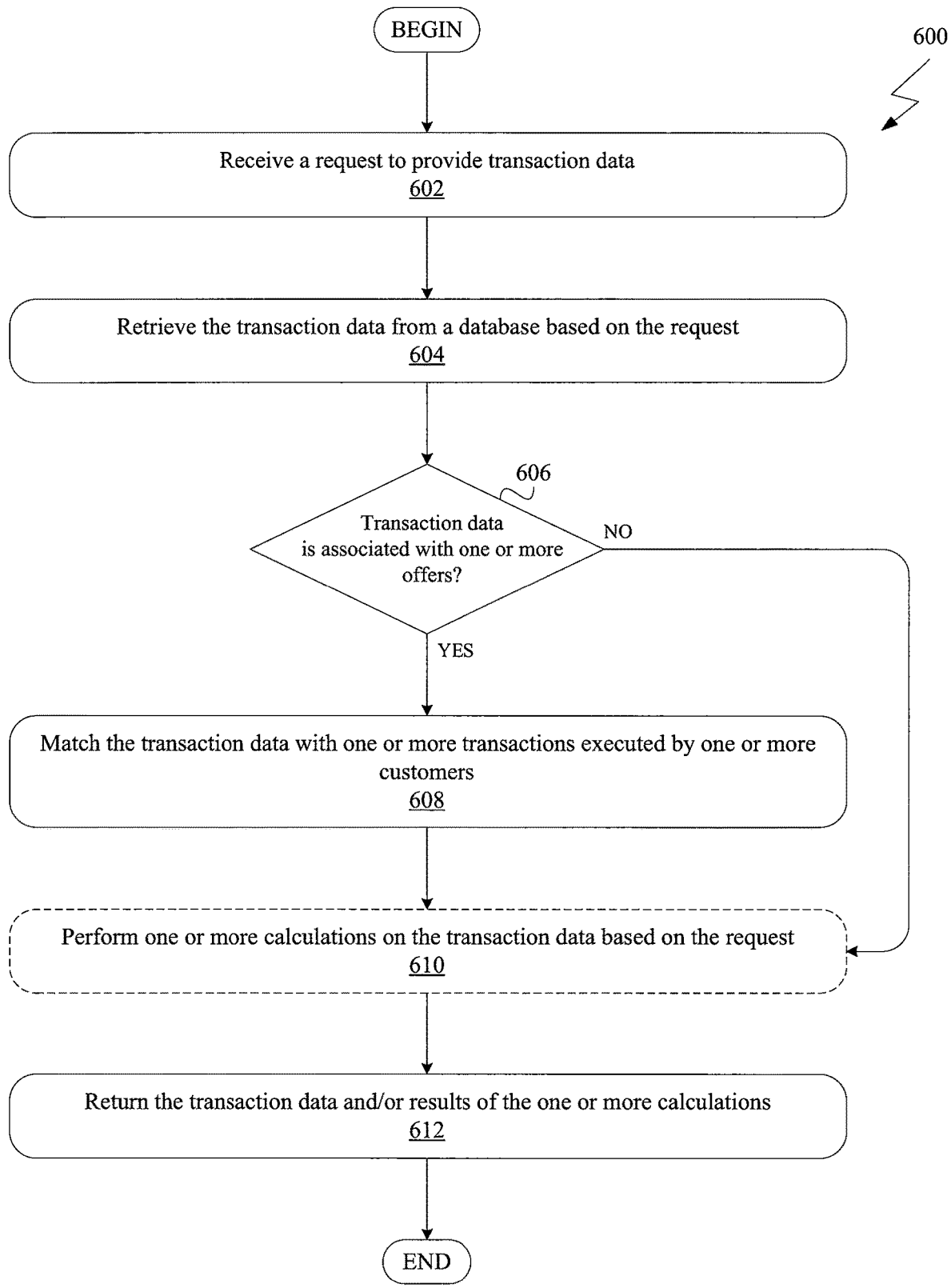
FIG. 6 is a flow diagram of method steps for providing transaction data based on a query, according to one embodiment of the invention.

FIG. 6 is a flow diagram of method steps 600 for providing transaction data based on a query, according to one embodiment of the invention. Persons skilled in the art will understand that, even though method 600 is described in conjunction with FIG. 1, any system configured to perform the method steps, in any order, is within the scope of embodiments of the invention. As shown, method 600 begins at step 602, where OE 108 receives a request to provide transaction data. Such a request may generated, for example, via menu 502 described above in conjunction with FIG. 5.

At step 604, OE 108 retrieves the transaction data from a database, e.g., DB 109 and or payment processing platform 110, based on the request. At step 606, OE 108 determines whether the transaction data is associated with one or more offers. If, at step 606, OE 108 determines that the transaction data is associated with one or more offers, then method 600 proceeds to step 608, where OE 108 matches the transaction data with one or more transactions executed by one or more customers according to the techniques described above in conjunction with FIG. 2.

Referring now back to step 506, if OE 108 determines that the transaction data is not associated with one or more offers, then method 600 proceeds to step 610, where OE 108 optionally performs one or more calculations on the transaction data based on the request. Such calculations include, for example, determining a number of unique customers who have purchased a particular product, as described above in conjunction with FIG. 5.

At step 612, OE 108 returns the transaction data and/or the results of the one or more calculations, which may then be displayed to, e.g., a campaign manager via output 504 described above in conjunction with FIG. 5.

Advantageously, embodiments of the invention provide an improved technique for determining the effectiveness of an online ad campaign. In particular, an administrator is able to query transaction data that is associated with a particular ad campaign. The query may specify one or more parameters that filter the transaction data to provide the administrator with a more granular view of aspects of the ad campaign. As a result, the merchant is able to determine a total cost per transaction in addition to areas in which the ad campaign needs improvement.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

What is claimed is:

1. A method for measuring conversion of an online advertising campaign for an offline merchant by communicating with a payment processor that facilitates electronic payment transactions between the offline merchant and respective customers of the offline merchant to determine completion of conversion transactions between the respective customers and the offline merchant in response to the respective customers receiving and accepting an online referral offer from the offline merchant via a plurality of different webpage advertisements, each webpage advertisement of the plurality of webpage advertisements including offer data for the online offer and being rendered by web browsers coupled to the Internet and used by the respective customers to view the plurality of different webpage advertisements for the online referral offer, wherein the offer data for the online referral offer specifies at least one criterion for the respective customers to satisfy the online referral offer and thereby complete the conversion transactions with the offline merchant, the method comprising:

storing, by an offer engine coupled to the Internet, offer information for the online referral offer, wherein the offer information includes:
        a merchant identifier of the offline merchant for the payment processor to facilitate the electronic payment transactions between the offline merchant and the respective customers of the offline merchant and
        the offer data specifying the at least one criterion for the customers to satisfy the
    online referral offer;
    determining, by the offer engine, that a first customer of the respective customers, viewing a first webpage advertisement including the online referral offer via a first web browser, clicked on the first webpage advertisement including the online referral offer;
    providing, by the offer engine via the Internet, an interface for display on the first web browser of the first customer to register a first customer account with the offer engine to accept the online referral offer;

in response to providing the interface to register the first customer account, receiving by the offer engine via the Internet:
  a first payment account number of a first payment account for the first customer, wherein the first payment account includes at least one of a customer credit card, a customer debit card, and a customer prepaid card; and
  at least one email address for at least one referral customer referred by the first customer;
transmitting, by the offer engine, using the at least one email address, a notification of the referral offer to the at least one referral customer;
transmitting a query to the payment processor, by the offer engine via the Internet, for a plurality of offline transactions for in-store purchases at one or more brick-and-mortar locations of the offline merchant, wherein the transmitted query includes the merchant identifier included in the offer information for the payment processor to facilitate the electronic payment transactions between the offline merchant and the respective customers of the offline merchant;
receiving the plurality of offline transactions from the payment processor in response to the query including the merchant identifier transmitted by the offer engine via the Internet, wherein the plurality of offline transactions received by the offer engine from the payment processor do not include an identification of the online referral offer; and
determining, by the offer engine based on the plurality of offline transactions received from the payment processor and the at least one criterion specified by the online referral offer in the stored offer information, whether the first customer has completed a first offline conversion transaction corresponding to the online referral offer by:
  determining if the at least one criterion specified by the online referral offer is satisfied in at least one offline transaction of the plurality of offline transactions received from the payment processor; and
  for each offline transaction of the at least one offline transaction in which the at least one criterion specified by the online referral offer is satisfied:
determining if one offline transaction of the at the at least one offline transaction is the first offline conversion transaction completed by the first customer, based at least in part on the first payment account number of the first payment account for the first customer received by the offer engine via the Internet in response to providing the interface to register the first customer account to accept the online referral offer.

2. The method of claim 1, wherein determining, by the offer engine, that the first customer clicked on the webpage advertisement including the online referral offer comprises:
  determining, via at least one of a browser cookie and Internet Protocol (IP) address tracking, that the first customer clicked on the webpage advertisement.

3. The method of claim 1, wherein:
  transmitting the notification of the referral offer to the at least one referral customer comprises providing in the notification a second interface for display to the at least one referral customer to register a first referral customer account with the offer engine to accept the online referral offer; and
  the method further comprises receiving, by the offer engine, in response to providing the second interface to register the first referral customer account, a second payment account number of a second payment account for the first referral customer, wherein the second payment account includes at least one of a first referral customer credit card, a first referral customer debit card, and a first referral customer prepaid card.

4. The method of claim 3, further comprising:
  determining, by the offer engine based on the one or more offline transactions received from the payment processor and the at least one criterion specified by the online referral offer in the stored offer information, whether the first referral customer has completed a second offline transaction corresponding to the online referral offer by:
  determining if a second offline transaction of the one or more offline transactions is the second offline transaction completed by the first referral customer, based at least in part on the second payment account number of the second payment account for the first referral customer received by the offer engine in response to providing the second interface to register the first referral customer account to accept the online referral offer.

5. The method of claim 1, wherein determining if the one offline transaction of the one or more offline transactions is the first offline transaction completed by the first customer further comprises:
  extracting, by the offer engine, a hashed transaction payment account number included in the one offline transaction;
  comparing the extracted hashed transaction payment account number against a first hashed account number corresponding to the first payment account number of the first payment account for the first customer received by the offer engine via the :Internet in response to providing the interface to register the first customer account; and
  determining that the first customer has completed the first offline transaction corresponding to the online referral offer if the extracted hashed transaction payment account number matches the first hashed account number corresponding to the first payment account number of the first payment account for the first customer.

6. The method of claim 1, wherein determining whether the first customer has completed the first offline transaction corresponding to the online offer comprises:
  determining whether the first customer performed an action comprising at least one of:
    purchasing a certain quantity of a good or service,
    spending a certain amount in a particular purchase,
    making a purchase at a particular time, or
    making a number of purchases within a particular amount of time.

7. The method of claim 1, wherein the one or more offline transactions are compiled for the payment processor by one or more of:
  a merchant system of the offline merchant;
  a payment card issuer that issues the at least one of the customer credit card, the customer debit card, and the customer prepaid card to the first customer;
  a payment processor system that processes the in-store sale using the at least one of the customer credit card, the customer debit card, and the customer prepaid card for the offline merchant;
  a point of sale system that processes the in-store sale for the offline merchant using the at least one of the customer credit card, the customer debit card, and the customer prepaid card; or a financial institution that maintains financial funds for at least one of the first customer or the offline merchant.

8. The method of claim 1, further comprising:
responsive to determining that the first customer has completed the first offline transaction corresponding to the online referral offer, providing a metric for display that is based on the first customer receiving the online referral offer and satisfying the online referral offer.

9. The method of claim 8, further comprising:
calculating, by the offer engine, a cost per transaction of the online advertising campaign by the offline merchant, based at least in part by dividing a total cost of the online advertising campaign by a number of the one or more offline transactions received from the payment processor that satisfy the at least one criterion specified by the online referral offer; and
transmitting, from the offer engine via the Internet to a second web browser, a second interface for display on the second web browser, wherein the second interface comprises:
　a menu to allow a first selection of the online advertising campaign from a plurality of different online advertising campaigns and a second selection to generate a report for at least one of:
　　online offers viewed vs. online offers clicked by the respective customers;
　　online offers clicked vs. online offers accepted by the respective customers;
　　online offers accepted vs. online offers satisfied by the respective customers; and
　　the cost per transaction of the online advertising campaign; and
　an output to display the at least one of the online offers viewed vs. online offers clicked by the respective customers, the online offers clicked vs. online offers accepted by the respective customers, the online offers accepted vs. online offers satisfied by the respective customers, and the cost per transaction of the online advertising campaign.

10. A non-transitory computer-readable medium storing instructions that, when executed by one or more processors, perform a method for measuring conversion of an online advertising campaign for an offline merchant by communicating with a payment processor that facilitates electronic payment transactions between the offline merchant and respective customers of the offline merchant to determine completion of conversion transactions between respective customers and the offline merchant in response to the respective customers receiving and accepting an online referral offer from the offline merchant via a plurality of different webpage advertisements, each webpage advertisement of the plurality of webpage advertisements including offer data for the online offer and being rendered by web browsers coupled to the Internet and used by the respective customers to view the plurality of different webpage advertisements for the online referral offer, wherein the online referral offer specifies at least one criterion for the respective customers to satisfy the online referral offer and thereby complete the conversion transactions with the offline merchant, the method comprising:
　storing, by an offer engine coupled to the Internet, offer information for the online referral offer, wherein the offer information includes:
　　a merchant identifier of the offline merchant for the payment processor to facilitate the electronic payment transactions between the offline merchant and the respective customers of the offline merchant and the offer data specifying the at least one criterion for the customers to satisfy the online referral offer;
determining, by the offer engine, that a first customer of the respective customers, viewing a first webpage advertisement including the online referral offer via a first web browser, clicked on the first webpage advertisement including the online referral offer;
providing, by the offer engine via the Internet, an interface for display on the first web browser of the first customer to register a first customer account with the offer engine to accept the online referral offer;
in response to providing the interface to register the first customer account, receiving by the offer engine via the Internet
　a first payment account number of a first payment account for the first customer, wherein the first payment account includes at least one of a customer credit card, a customer debit card, and a customer prepaid card; and
　at least one email address for at least one referral customer referred by the first customer;
transmitting, by the offer engine, using the at least one email address, a notification of he referral offer to the at least one referral customer;
transmitting a query to the payment processor, by the offer engine via the Internet, for a plurality of offline transactions for in-store purchases at one or more brick-and-mortar locations of the offline merchant, wherein the transmitted query includes the merchant identifier included in the offer information for the payment processor to facilitate the electronic payment transactions between the offline merchant and the respective customers of the offline merchant;
receiving the plurality of offline transactions from the payment processor in response to the query including the merchant identifier transmitted by the offer engine via the Internet, wherein the plurality of offline transactions received by the offer engine from the payment processor do not include an identification of the online referral offer; and
determining, by the offer engine based on the plurality of offline transactions received from the payment processor and the at least one criterion specified by the online referral offer in the stored offer information, whether the first customer has completed a first offline conversion transaction corresponding to the online referral offer by:
　determining if the at least one criterion specified by the online referral offer is satisfied in at least one offline transaction of the plurality of offline transactions received from the payment processor; and
　for each offline transaction of the at least one offline transaction in which the at least one criterion specified by the online referral offer is satisfied:
　　determining if one offline transaction of the the at least one offline transaction is the first offline conversion transaction completed by the first customer, based at least in part on the first payment account number of the first payment account for the first customer received by the offer engine via the Internet in response to providing the interface to register the first customer account to accept the online referral offer.

11. The computer readable medium of claim 10, wherein in the method, determining by the offer engine that the first customer clicked on the webpage advertisement including the online referral offer comprises:

determining, via at least one of a browser cookie and Internet Protocol (IP) address tracking, that the first customer clicked on the webpage advertisement.

12. The computer readable medium of claim 10, wherein:

in the method, transmitting the notification of the referral offer to the at least one referral customer comprises providing in the notification a second interface for display to the at least one referral customer to register a first referral customer account with the offer engine to accept the online referral offer; and the method further comprises receiving, by the offer engine, in response to providing the second interface to register the first referral customer account, a second payment account number of a second payment account for the first referral customer, wherein the second payment account includes at least one of a first referral customer credit card, a first referral customer debit card, and a first referral customer prepaid card.

13. The computer readable medium of claim 12, wherein the method further comprises:

determining, by the offer engine based on the one or more offline transactions received from the payment processor and the at least one criterion specified by the online referral offer in the stored offer information, whether the first referral customer has completed a second offline transaction corresponding to the online referral offer by:

determining if a second offline transaction of the one or more offline transactions is the second offline transaction completed by the first referral customer, based at least in part on the second payment account number of the second payment account for the first referral customer received by the offer engine in response to providing the second interface to register the first referral customer account to accept the online referral offer.

14. The computer readable medium of claim 10, wherein in the method, determining if the one offline transaction of the one or more offline transactions is the first offline transaction completed by the first customer further comprises:

extracting, by the offer engine, a hashed transaction payment account number included in the one offline transaction;

comparing the extracted hashed transaction payment account number against a first hashed account number corresponding to the first payment account number of the first payment account for the first customer received by the offer engine via the Internet in response to providing the interface to register the first customer account; and determining that the first customer has completed the first offline transaction corresponding to the online referral offer if the extracted hashed transaction payment account number matches the first hashed account number corresponding to the first payment account number of the first payment account for the first customer.

15. The computer readable medium of claim 10, wherein in the method, determining whether the first customer has completed the first offline transaction corresponding to the online offer comprises:

determining whether the first customer performed an action comprising at least one of:
purchasing a certain quantity of a good or service,
spending a certain amount in a particular purchase,
making a purchase at a particular time, or
making a number of purchases within a particular amount of time.

16. The computer readable medium of claim 10, wherein the one or more offline transactions are compiled for the payment processor by one or more of:

a merchant system of the offline merchant;
a payment card issuer that issues the at least one of the customer credit card, the customer debit card, and the customer prepaid card to the first customer;
a payment processor system that processes the in-store sale using the at least one of the customer credit card, the customer debit card, and the customer prepaid card for the offline merchant;
a point of sale system that processes the in-store sale for the offline merchant using the at least one of the customer credit card, the customer debit card, and the customer prepaid card; or
a financial institution that maintains financial funds for at least one of the first customer or the offline merchant.

17. The computer readable medium of claim 10, wherein the method further comprises:

responsive to determining that the first customer has completed the first offline transaction corresponding to the online referral offer, providing a metric for display that is based on the first customer receiving the online referral offer and satisfying the online referral offer.

18. The computer readable medium of claim 17, wherein the method further comprises:

calculating, by the offer engine, a cost per transaction of the online advertising campaign by the offline merchant, based at least in part by dividing a total cost of the online advertising campaign by a number of the one or more offline transactions received from the payment processor that satisfy the at least one criterion specified by the online referral offer; and transmitting, from the offer engine via the Internet to a second web browser, a second interface for display on the second web browser, wherein the second interface comprises:

a menu to allow a first selection of the online advertising campaign from a plurality of different online advertising campaigns and a second selection to generate a report for at least one of:
online offers viewed vs. online offers clicked by the respective customers;
online offers clicked vs. online offers accepted by the respective customers;
online offers accepted vs. online offers satisfied by the respective customers; and
the cost per transaction of the online advertising campaign; and an output to display the at least one of the online offers viewed vs. online offers clicked by the respective customers, the online offers clicked vs. online offers accepted by the respective customers, the online offers accepted vs. online offers satisfied by the respective customers, and the cost per transaction of the online advertising campaign.

19. A system to measure conversion of an online advertising campaign for an offline merchant by communicating with a payment processor that facilitates electronic payment transactions between the offline merchant and respective customers of the offline merchant to determine completion of conversion transactions between respective customers and the offline merchant in response to the respective customers receiving and accepting an online referral offer from the offline merchant via a plurality of different webpage advertisements, each webpage advertisement of the plurality of webpage advertisements including offer data for the online offer and being rendered by web browsers coupled to the Internet and used by the respective customers to view plurality of different webpage advertisements for the online referral offer, wherein the offer data for the online referral offer specifies at least one criterion for the respective customers to satisfy the online referral offer and thereby complete the conversion transactions with the offline merchant, the system comprising:
 a computer processor; and
 a memory to store instructions that are executable by the computer processor to cause the processor to:
  store offer information for the online referral offer, wherein the offer information includes:
   a merchant identifier of the offline merchant for the payment processor to facilitate the electronic payment transactions between the offline merchant and the respective customers of the offline merchant; and
   the offer data specifying the at least one criterion for the customers to satisfy the online referral offer;
  determine that a first customer of the respective customers viewing a first webpage advertisement including the online referral offer via a first web browser, clicked on the first webpage advertisement including the online referral offer;
  provide, via the Internet, an interface for display on the first web browser of the first customer to register a first customer account with the offer engine to accept the online referral offer;
  in response to providing the interface to register the first customer account, receive via the Internet:
   a first payment account number of a first payment account for the first customer, wherein the first payment account includes at least one of a customer credit card, a customer debit card, and a customer prepaid card; and
   at least one email address for at least one referral customer referred by the first customer;
  transmit, by the offer engine, using the at least one email address, a notification of the referral offer to the at least one referral customer;
  transmit a query to the payment processor, via the Internet to a payment processor, for a plurality of offline transactions for in-store purchases at one or more brick-and-mortar locations of the offline merchant, wherein the transmitted query includes the merchant identifier included in the offer information for the payment processor to facilitate the electronic payment transactions between the offline merchant and the respective customers of the offline merchant;
  receive the plurality of offline transactions from the payment processor in response to the query including the merchant identifier transmitted via the Internet, wherein the plurality of offline transactions received by the offer engine from the payment processor do not include an identification of the online referral offer; and
  determine, based on the plurality of offline transactions received from the payment processor and the at least one criterion specified by the online referral offer in the stored offer information, whether the first customer has completed a first offline conversion transaction corresponding to the online referral offer by:
   determining if the at least one criterion specified by the online referral offer is satisfied in at least one offline transaction of the plurality of offline transactions received from the payment processor; and
   for each offline transaction of the at least one offline transaction in which the at least one criterion specified by the online referral offer is satisfied:
  determining if one offline transaction of the the at least one offline transaction is the first offline conversion transaction completed by the first customer, based at least in part on the first payment account number of the first payment account for the first customer received by the offer engine via the Internet in response to providing the interface to register the first customer account to accept the online referral offer.

20. The system of claim 19, wherein in determining that the first customer clicked on the webpage advertisement including the online referral offer, the instructions further cause the computer processor to:
 determine, via at least one of a browser cookie and Internet Protocol (IP) address tracking, that the first customer clicked on the webpage advertisement.

21. The system of claim 19, wherein:
 in transmitting the notification of the referral offer to the at least one referral customer, the instructions further cause the computer processor to provide in the notification a second interface for display to the at least one referral customer to register a first referral customer account to accept the online referral offer; and
 the instructions further cause the computer processor to receive, in response to providing the second interface to register the first referral customer account, a second payment account number of a second payment account for the first referral customer, wherein the second payment account includes at least one of a first referral customer credit card, a first referral customer debit card, and a first referral customer prepaid card.

22. The system of claim 21, wherein the instructions further cause the computer processor to:
 determine, based on the one or more offline transactions received from the payment processor and the at least one criterion specified by the online referral offer in the stored offer information, whether the first referral customer has completed a second offline transaction corresponding to the online referral offer by:
  determining if a second offline transaction of the one or more offline transactions is the second offline transaction completed by the first referral customer, based at least in part on the second payment account number of the second payment account for the first referral customer received by the offer engine in response to providing the second interface to register the first referral customer account to accept the online referral offer.

23. The system of claim 19, wherein in determining if the one offline transaction of the one or more offline transactions is the first offline transaction completed by the first customer, the instruction further cause the computer processor to:
 extract a hashed transaction payment account number included in the one offline transaction;

compare the extracted hashed transaction payment account number against a first hashed account number corresponding to the first payment account number of the first payment account for the first customer received via the Internet in response to providing the interface to register the first customer account; and determine that the first customer has completed the first offline transaction corresponding to the online referral offer if the extracted hashed transaction payment account number matches the first hashed account number corresponding to the first payment account number of the first payment account for the first customer.

24. The system of claim 19, wherein in determining whether the first customer has completed the first offline transaction corresponding to the online offer, the instructions further cause the computer processor to:

determine whether the first customer performed an action comprising at least one of:
purchasing a certain quantity of a good or service,
spending a certain amount in a particular purchase,
making a purchase at a particular time, or
making a number of purchases within a particular amount of time.

25. The system of claim 19, wherein the one or more offline transactions are compiled for the payment processor by one or more of:
a merchant system of the offline merchant;
a payment card issuer that issues the at least one of the customer credit card, the customer debit card, and the customer prepaid card to the first customer;
a payment processor system that processes the in-store sale using the at least one of the customer credit card, the customer debit card, and the customer prepaid card for the offline merchant;
a point of sale system that processes the in-store sale for the offline merchant using the at least one of the customer credit card, the customer debit card, and the customer prepaid card; or a financial institution that maintains financial funds for at least one of the first customer or the offline merchant.

26. The system of claim 19, wherein the instructions further cause the computer processor to:
provide a metric for display that is based on the first customer receiving the online referral offer and satisfying the online referral offer, responsive to determining that the first customer has completed the first offline transaction corresponding to the online referral offer.

27. The system of claim 26, wherein the instructions further cause the computer processor to:
calculate a cost per transaction of the online advertising campaign by the offline merchant, based at least in part by dividing a total cost of the online advertising campaign by a number of the one or more offline transactions received from the payment processor that satisfy the at least one criterion specified by the online referral offer; and transmit, via the Internet to a second web browser, a second interface for display on the second web browser, wherein the second interface comprises:
a menu to allow a first selection of the online advertising campaign from a plurality of different online advertising campaigns and a second selection to generate a report for at least one of:
online offers viewed vs. online offers clicked by the respective customers;
online offers clicked vs. online offers accepted by the respective customers;
online offers accepted vs. online offers satisfied by the respective customers; and
the cost per transaction of the online advertising campaign; and
an output to display the at least one of the online offers viewed vs. online offers clicked by the respective customers, the online offers clicked vs. online offers accepted by the respective customers, the online offers accepted vs. online offers satisfied by the respective customers, and the cost per transaction of the online advertising campaign.

\* \* \* \* \*